United States Patent [19]
Kubo

[11] Patent Number: 5,140,617
[45] Date of Patent: Aug. 18, 1992

[54] FRAME PHASE ESTIMATION METHOD AND CIRCUIT

[75] Inventor: Hiroshi Kubo, Kanagawa, Japan

[73] Assignee: Mitsubishi Denki Kabushiki Kaisha, Tokyo, Japan

[21] Appl. No.: 650,130

[22] Filed: Feb. 4, 1991

[30] Foreign Application Priority Data

Jul. 2, 1990 [JP] Japan ................................. 2-29123

[51] Int. Cl.$^5$ .............................................. H04L 7/08
[52] U.S. Cl. ................................. 375/114; 364/728.03
[58] Field of Search .............. 375/106, 114, 116, 119; 370/105.4; 364/715.11, 728.03, 819

[56] References Cited

U.S. PATENT DOCUMENTS 3,575,554  4/1971  Schmidt ............................. 375/114
5,016,206  5/1991  Shinonaga .......................... 375/116

Primary Examiner—Benedict V. Safourek
Attorney, Agent, or Firm—Rothwell, Figg, Ernst & Kurz

[57] ABSTRACT

A frame phase estimation method and circuit for estimating the phase of a received digital signal in which the lead phase of the received signal is successively delayed by an amount equal to a sample period of the signal, cross-correlation values for each delayed signal with respect to a known transmission pattern are calculated, and a predetermined number of cross-correlation values of subsequent phases are added to the cross-correlation value of each initial phase. The true initial phase of the signal is estimated to be the initial phase corresponding to the maximum sum of cross-correlation values.

6 Claims, 6 Drawing Sheets

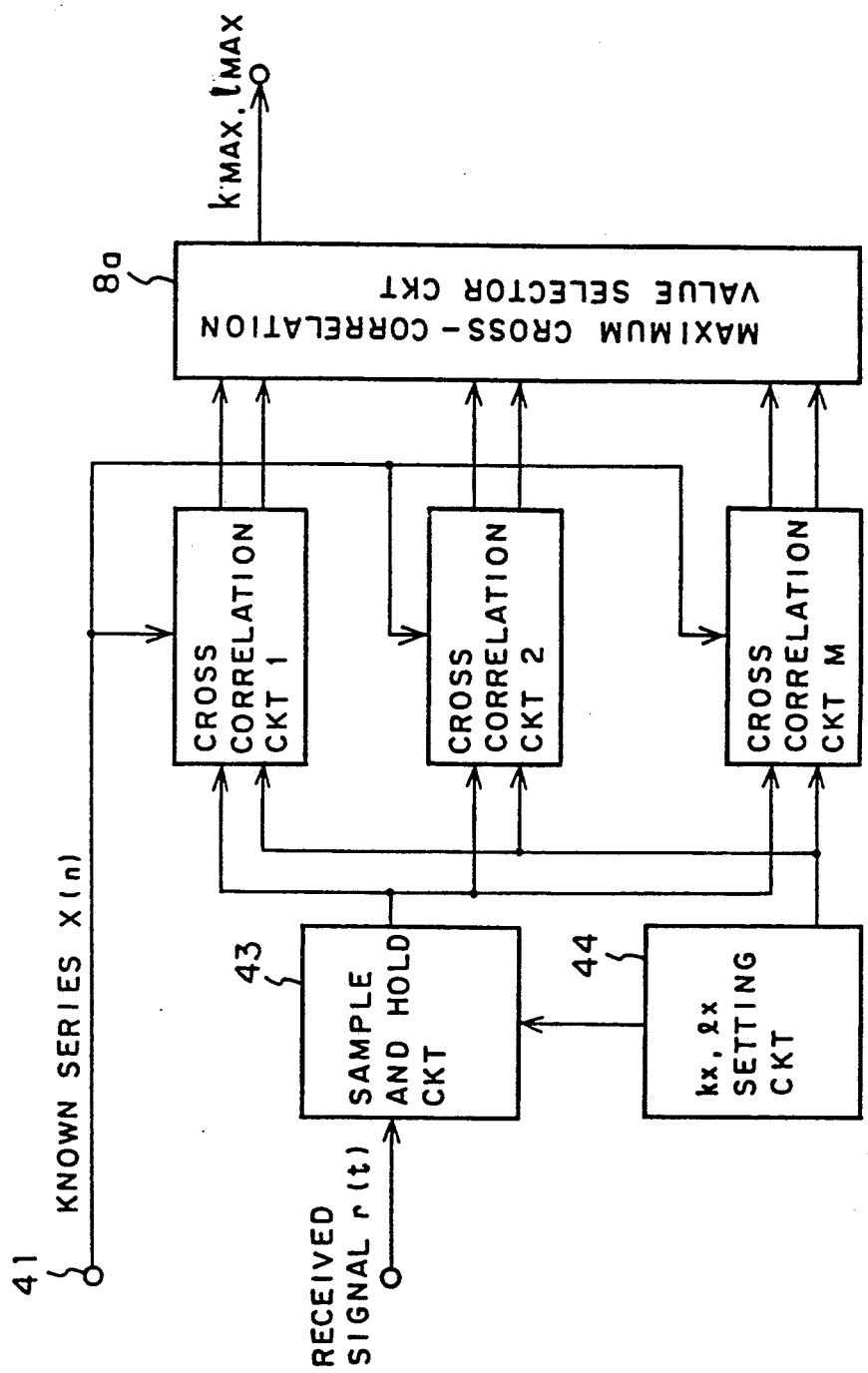
FIG. 2 (A) (PRIOR ART)

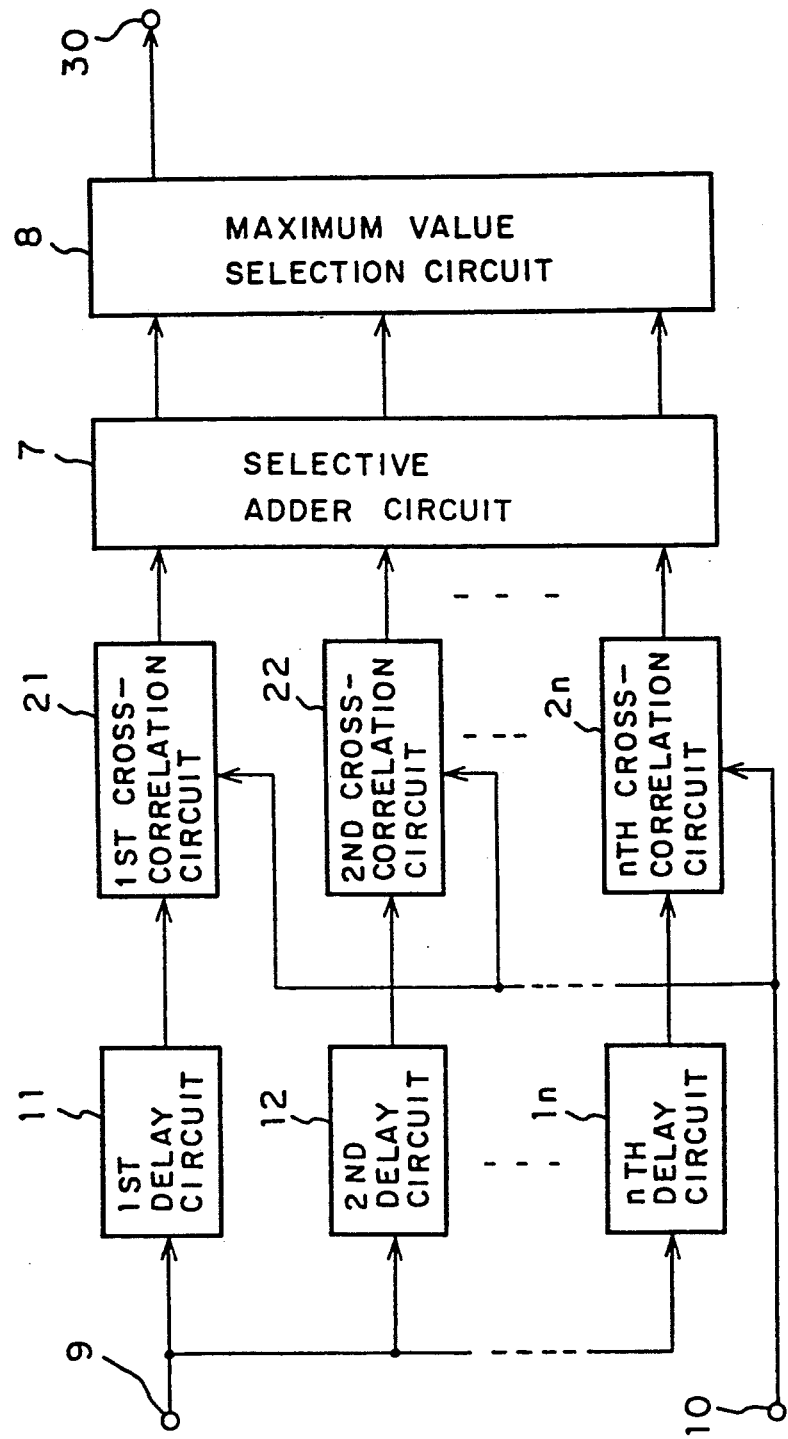

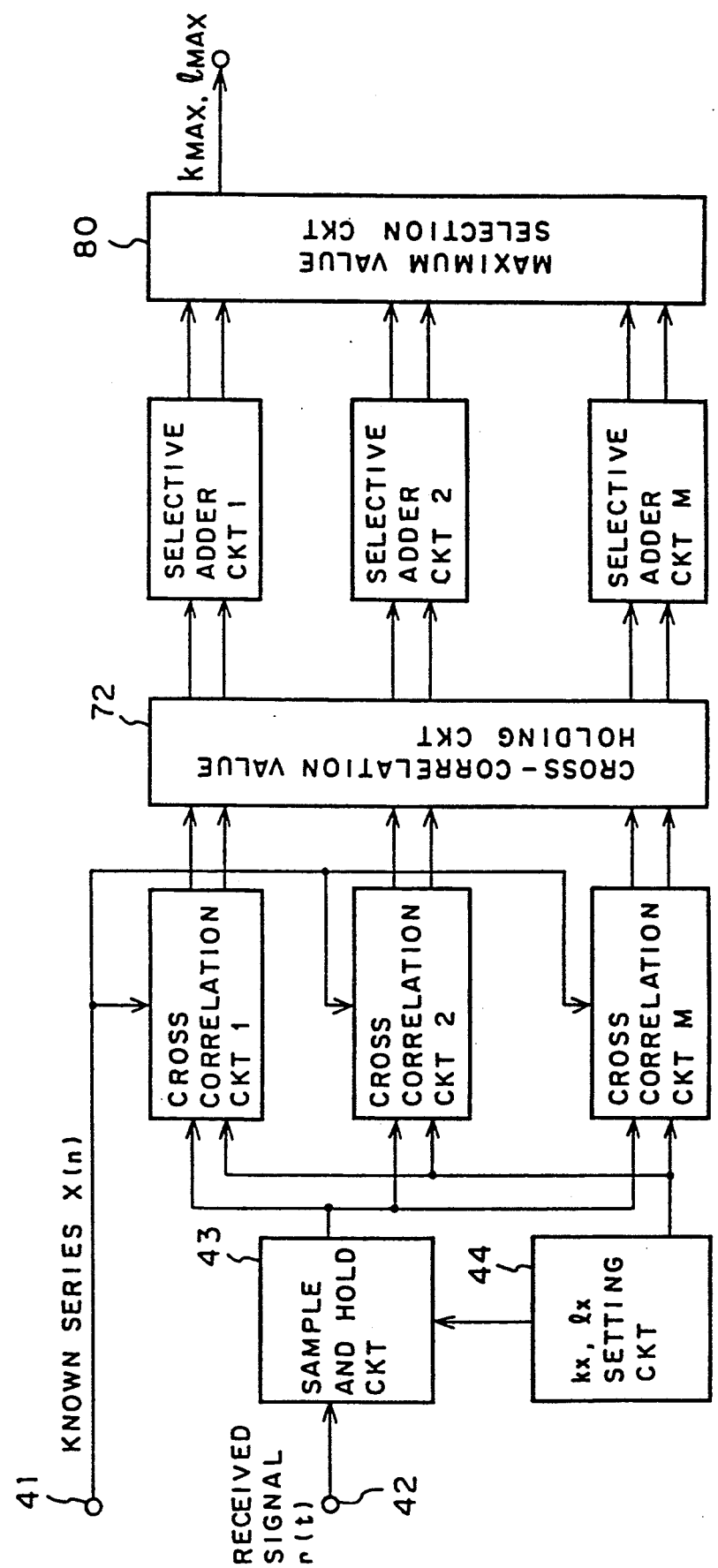

FRAME PHASE ESTIMATION METHOD AND CIRCUIT

BACKGROUND OF THE INVENTION

1. Field of the Invention

The present invention relates to a frame phase or sampling time estimation method and circuit for use in digital data transmission. Such a circuit is used to estimate the signal phase for a received digital data signal which has been transmitted over a channel subject to multipath delay and containing noise.

2. Description of the Prior Art

If it is given that a sampling point in time for an $n^{th}$ symbol in a symbol sequence $f(n)$ is represented as $t(n)$, $t(n)$ may be expressed as:

$$t(n) = n \cdot T + t_0 \qquad (1)$$

n: integer
T: symbol period
$t_0$: initial value (phase).

If oversampling is carried out, that is, the sequence is sampled at $\alpha$ times the sampling period T, the initial value $t_0$ is represented by the following equation:

$$t_0 = k \cdot T + l \cdot (T/\alpha) + \tau_0 \qquad (2)$$

k: integer
l: integer, $0 < l < \alpha - 1$
$\tau_0$: constant determined by the sampling interval.

Thus, in order for the $n^{th}$ symbol to be correctly sampled at a receiver which receives the symbol sequence $x(n)$ as a received signal $r(t)$, it is necessary to correctly determine the values of k and l, in order to correctly calculate the initial phase value $t_0$.

If the received signal $r(t)$ is sampled at the receiver with a sampling interval of $t(n)$ where $t_0 = k_x \cdot T + l_x \cdot (T/\alpha) + \tau_0$, the $n^{th}$ symbol is expressed as $r(n; k_x, l_x)$, where x denotes a variable value of k and l. To determine the correct values of $k_x$ and $l_x$, a frame synchronization transmission is carried out at the beginning of communication wherein a known transmitted symbol sequence $x(n)$, $n = 0, 1, \ldots, N-1$ is transmitted, and a cross-correlation $P(k_x, l_x)$ between the received symbol sequence $r(n; k_x, l_x)$ and the known symbol sequence $x(n)$ is calculated for a predetermined number M of combinations of values of $k_x$ and $l_x$, wherein $$P(k_x, l_x) = \frac{1}{N} \sum_{i=0}^{N-1} x(i) r(i; k_x, l_x) \qquad (3)$$

FIG. 1 is a flow chart showing a frame phase estimation method which is shown in Giovanna D'Aria, Valerio Zingrelli, "Design and performance of synchronization techniques and Viterbi adaptive equalizer for narrow band TDMA mobile radio," Proc. 3rd, NS on DLMRC., pp. 279 to 286, Sept. 1988; in this method, oversampling is not assumed for simplicity and thus the value l is ignored. In the figure, "Initial setting of K" is a step in which an initial setting of an initial signal phase K of a received digital signal is made (an initial value K is set) and the transmitted signal is sampled according to the initial phase; "K = K + 1" is a step in which the initial phase is changed by adding a delay time equivalent to a period of one sample; "calculation of $|P(K)|$" is a step in which the cross-correlation between a received digital signal and a known transmitted pattern such as a frame synchronization bit pattern is calculated and the magnitude of the cross-correlation is obtained in the case where the initial phase is decided to be K; and "the storage of Kmax" is a step in which the value of K when the magnitude of the cross-correlation P (K) takes a maximum value is stored.

Next, the explanation of operation will be given.

In a conventional frame phase estimation method, during a frame synchronization period, the initial phase K of a received signal is changed for each processing loop by the addition of a delay time equivalent to a period of one sample of a received signal and an optimum frame phase is estimated as described in the following. At first, the cross-correlation between a received signal corresponding to a given K and a known transmitted pattern is calculated to obtain the magnitude of the cross-correlation. Next, the magnitude $|P(K)|$ is compared with a magnitude $|P\text{Kmax}|$ which has been previously stored and if $|P(K)|$ is larger than $|P\text{Kmax}|$, K is stored as Kmax and $|P(K)|$ is stored as $|P(\text{Kmax})|$, and if $|P(K)|$ is not larger than $|P(\text{Kmax})|$, the stored Kmax and $|P(\text{Kmax})|$ are left as they are. The operation is repeated until K becomes larger than $K_0$ (a constant determined according to the sampling period), and the final Kmax is regarded as a frame phase estimation value.

FIG. 2 is a block diagram showing a conventional frame phase estimation circuit for realizing the frame phase estimation method described above. In the figure, 11 is a first delay circuit which applies a fixed delay (for example, a value k estimated to be a true fram phase) to a received signal inputted from a received signal input terminal 9; 12 is a second delay circuit which applies a different delay (for example, k + 1) from that of the first delay circuit 11 to the received signal circuit 11; 1n is an nth delay circuit which applies a delay (for example, k + (n − 1)) different from the first delay circuit 11 and the second delay circuit 12; 21 is a first cross-correlation circuit for calculating the cross-correlation between the output of the first delay circuit 11 and a known pattern of the transmitted signal from a pattern input terminal 10; 22 is a second cross-correlation circuit for calculating the cross-correlation between the output of the second delay circuit 12 and the above-mentioned known signal pattern; 2n is an nth cross-correlation circuit for calculating the cross-correlation between the output of the nth delay circuit 1n and the above-mentioned signal pattern; 8 is a maximum value selection circuit in which a maximum value among the n values of cross-correlations outputted from the cross-correlation circuits 21 to 2n is obtained, and which outputs a delay value corresponding to the obtained maximum value as a frame phase from a frame phase output terminal 30.

Next, the explanation of operation will be given. The first delay circuit 11 applies a fixed delay, previously selected, to a received signal inputted from received signal input terminal 9; the second delay circuit 12 applies a different delay from that of the first delay circuit 11; the nth delay circuit 1n applies a delay different from the delays of the first delay circuit 11 and the second delay circuit 12; in this way, n different values of delays are applied to the received signal. The first cross-correlation circuit 21 calculates the cross-correlation between a delay signal outputted from the first delay circuit 11 and a signal pattern inputted from a pattern input terminal 10; the second cross-correlation circuit 22, in a similar way to the above, calculates the cross-correlation between a delay signal output from the second delay circuit 12 and the signal pattern; the nth cross correlation circuit 2n, in a similar way to the above, calculates the cross-correlation between a delay signal output from the nth delay circuit and the signal pattern; in this way, the values of cross-correlations for n different values of delays are formed. The maximum value selection circuit 8 selects a maximum value among the n values of cross-correlations outputted from the first cross-correlation circuit 21 to the nth cross-correlation circuit 2n, and outputs a delay value corresponding to the maximum value as a frame phase from the frame phase output terminal 30.

FIG. 2A is a block diagram of a conventional frame phase estimation circuit taking into account the value 1 when oversampling is performed on the received signal r(t). The received signal r(t) is applied to input terminal 42 of sample and hold circuit 43, where it is sampled and stored. M different values of combinations of $k_x$ and $l_x$ are set into the sample and hold circuit 43 by setting circuit 44, in order to set different values for the initial phase $t_0$. Then, each sampled sequence is inputted into a corresponding cross-correlation circuit 1 to M, where the cross-correlation between the sampled sequence and the known sequence x(n) is calculated, and their absolute values obtained. The results are inputted to maximum cross-correlation selector circuit 8a, where the values of $k_x$ and $l_x$ corresponding to the maximum cross-correlation value are outputted as $k_{max}$ and $l_{max}$ to be used in the calculation of $t_0$ for setting the sampling interval initial phase.

Since the conventional frame phase estimation method and the frame phase estimation circuit are constituted as described above, in the cases where a delayed wave which is generated by multipath propagation delays or the like grows larger than the main wave, or the cross-correlation magnitude is made large by noise etc., there is a problem that a frame phase can be estimated erroneously.

In FIG. 3, examples of magnitudes of cross-correlations corresponding to various initial signal phases, that is, the magnitudes of cross-correlations corresponding to various delay values are shown. In the figure, (1) to (9) show initial signal phases, that is, delay values. In this example, the magnitude of a cross-correlation corresponding to initial phase (6) is the largest and the initial phase (6) is thus estimated to be the true frame phase. In the cases, however, where the cross-correlation magnitude corresponding to an initial phase (8) is made larger (by a delayed wave generated by multipath propagation delay or interference between signals) than the cross-correlation magnitude generated by the main wave (the cross-correlation corresponding to the initial phase (6)), or where a cross-correlation exists which is made large by noise etc. such as the cross-correlation magnitude shown with a broken line in the initial phase (3), a frame phase can be estimated erroneously.

A digital pulse compressor described in U.S. Pat. No. 4,679,210 is intended for high speed operation of a single correlation value by digitizing a single signal and taking correlation for each of the bits; the frame phase estimation according to the present invention is for calculating a plurality of correlation values having a plurality of bits, and it is different in principle form the invention described in the above mentioned patent.

SUMMARY OF THE INVENTION

The present invention solves the problems described above, and the object of the invention is to obtain a frame phase estimation method and circuit with which an accurate frame phase can be estimated without being influenced by interference between signals caused by multipath propagation or noise.

The frame phase estimation method and circuit according to the present invention are able to estimate the true frame phase by comparing each cross-correlation magnitude corresponding to each initial phase with the sum of the cross-correlation magnitudes corresponding to a plurality of initial phases following the above-mentioned initial phase.

In the present invention, cross-correlation magnitudes corresponding to a plurality of initial phases are not simply compared to each other, but a predetermined number of cross-correlation magnitudes for subsequent initial phases is added to each cross-correlation magnitude, and these sums are compared for performing the frame phase estimation; thereby a frame phase estimation method and circuit can be realized with which an accurate frame phase can be estimated without being influenced by interference between signals or by noise.

BRIEF DESCRIPTION OF THE DRAWINGS

FIG. 2A is a block diagram showing another conventional frame phase estimation circuit.

FIG. 6 is a block diagram showing a frame phase estimation circuit according to another embodiment of the present invention.

FIG. 7 is a block diagram showing a frame phase estimation circuit according to still another embodiment of the present invention.

DETAILED DESCRIPTION OF THE PREFERRED EMBODIMENTS

Figure 4:
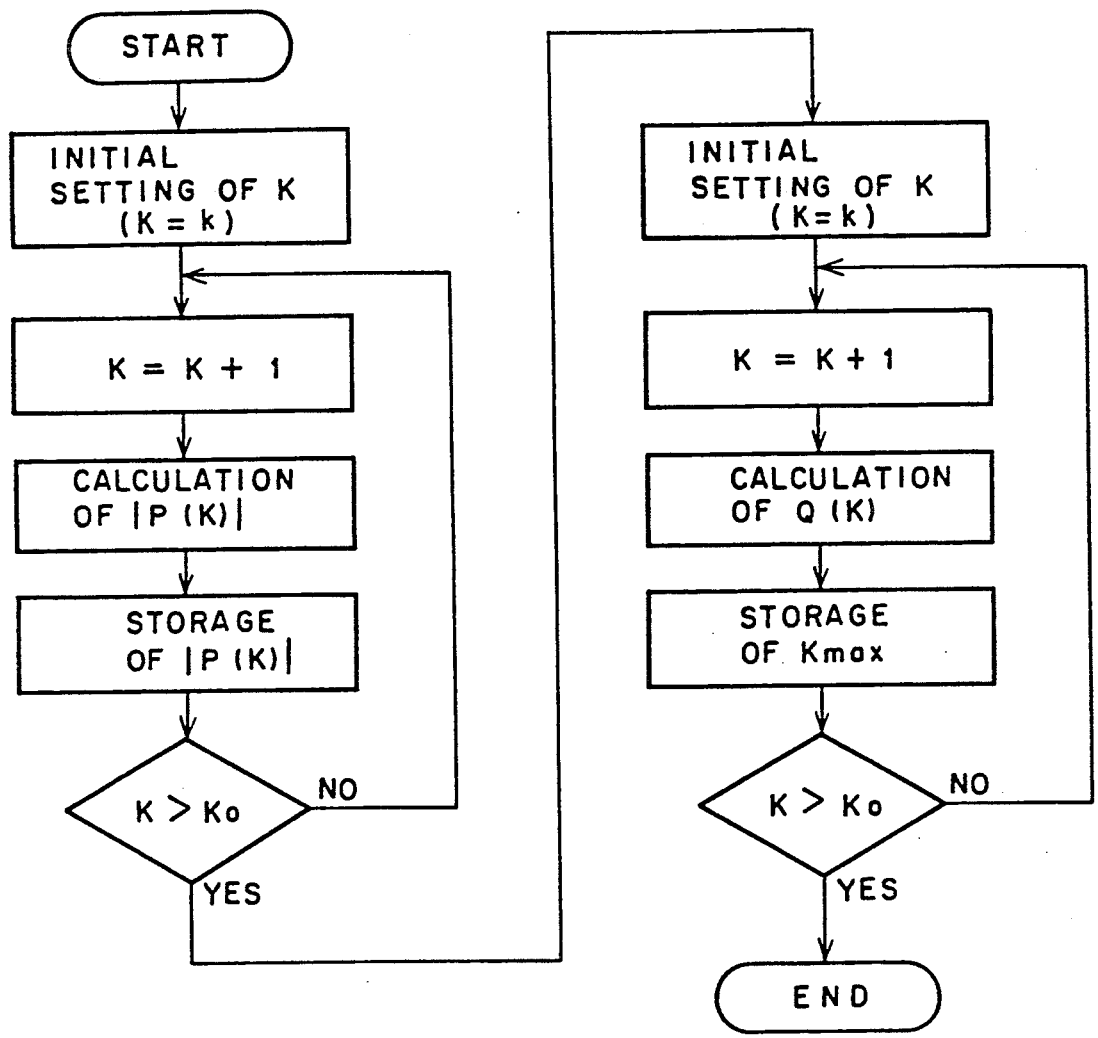
FIG. 4 is a flow chart showing a frame phase estimation method according to one embodiment of the present invention.

FIG. 4 is a flow chart showing an embodiment of the present invention, in which the frame phase estimation may be performed by a digital signal processor.

In the figure: "storage of $|P(K)|$" is a step in which $|P(K)|$ is stored for an initial phase of K; "calculation of Q (K)" is a step in which Q (K) is calculated which is a value of a magnitude of a cross-correlation P (K) added with magnitudes of specified initial phases; and "storage of Kmax" is a step in which the value of K is stored when Q (K) takes a maximum value.

The explanation of operation will be given in the following.

In the data frame phase estimation method of the present invention, the initial phase K of a received digital signal is changed by adding a delay time equivalent to a period of one sample of a received signal for every processing loop, and a value $|P(K)|$ corresponding to each initial phase is calculated and stored. Thus an optimum frame phase can be estimated by the steps of operation as mentioned below. At first, to a value $|P(K)|$ corresponding to a given initial phase K, the following $P(K+i)$ $(i=1, \cdots, L)$ of L (a constant) terms are added to obtain a value $Q(K)$. The value $Q(K)$ is compared with the value $Q(Kmax)$ previously stored and, if the $Q(K)$ is larger than the value $Q(Kmax)$, the value of K is stored as Kmax and the value $Q(K)$ is stored as $Q(Kmax)$. If the value $Q(K)$ is not larger than the value $Q(Kmax)$, the stored Kmax and $Q(Kmax)$ are left as they are. The operation is repeated until K is larger than $K_0$ (a constant determined according to the sampling period), and the final Kmax is regarded as a frame phase estimation value. For the constant L, a a proper value is selected corresponding to the characteristics of a transmission path, etc.

Figure 3:
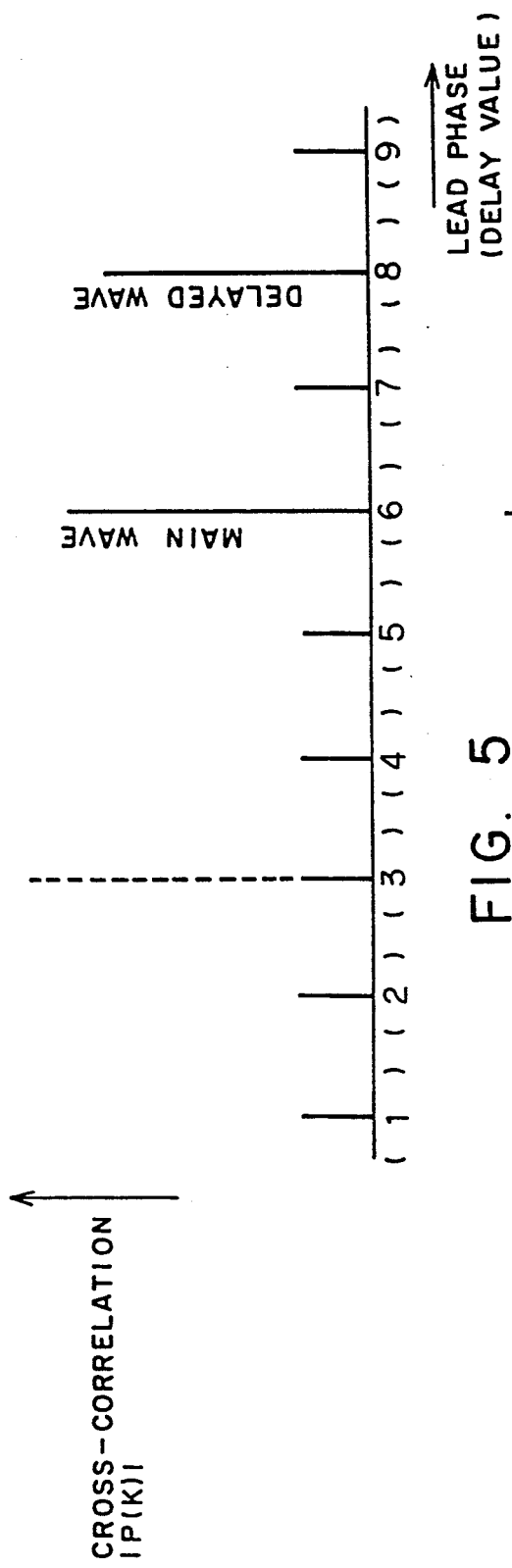
FIG. 3 is an illustrative representation showing the relation between an initial phase and a cross-correlation magnitude quantity in a conventional frame phase estimation method.
Figure 5:
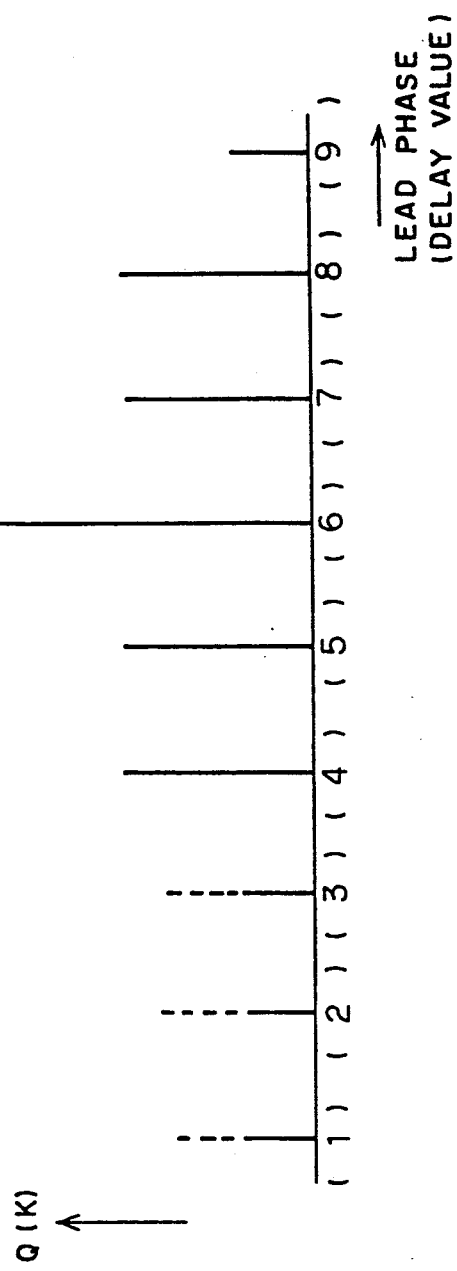
FIG. 5 is an illustrative representation showing the relation between each initial phase and each cross-correlation magnitude quantity in a frame phase estimation method according to the present invention.

In FIG. 5, there is shown a graph of the results of a frame phase estimation method according to the present invention. This figure shows the case where each magnitude of cross-correlation shown in FIG. 3 is added with the magnitudes of the next 2 initial phases, that is, a $Q(K)$ corresponding to each initial phase when L is 2 is shown. In the figure, (1) to (9) show the same points, that is, the same initial phases as the initial phases of the received signal (1) to (9) shown in FIG. 3. The $Q(K)$ at initial phase (6), that is, the sum of each $P(K)$ corresponding to the initial phases (6), (7) and (8) shows a maximum value. Even in the case where the magnitude of a main wave becomes smaller than that of a delayed wave, the value at the initial phase (6) is selected as a maximum value. The noise applied at initial phase (3) of FIG. 3 is averaged over 3 initial phases, and exerts no influence upon the estimation of a frame phase.

Figure 1:
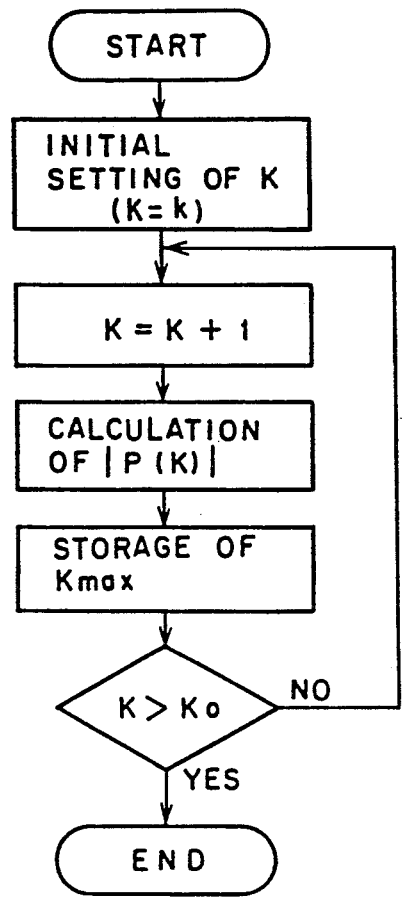
FIG. 1 is a flow chart showing a conventional frame phase estimation method.
Figure 2:
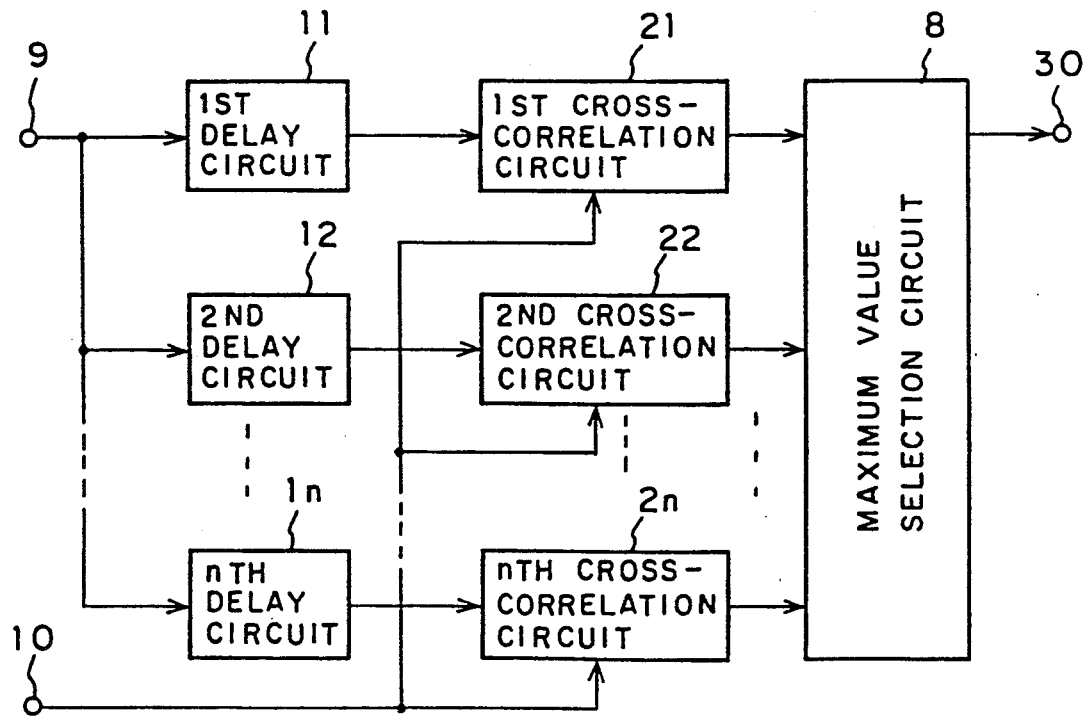
FIG. 2 is a block diagram showing a conventional frame phase estimation circuit.

FIG. 6 is a block diagram showing an embodiment of a hardwired circuit of the present invention. In FIG. 6, parts which are the same as those or equivalent to those in FIG. 2, are given the same designations as those in FIG. 2 and the explanation for them is omitted.

In FIG. 6, 7 is a selective adder circuit which selects certain cross-correlation magnitudes for the delay values to be added to a cross-correlation magnitude for each delay value and adds those magnitudes to the cross-correlation magnitude corresponding to each delay value.

Next, the explanation of operation will be given.

A cross-correlation magnitude for each delay value (initial phase) stored in circuits 11 - 1n is calculated in cross-correlation circuits 21 - 2n and is inputted to the selective adder circuit 7, and it selects and adds cross-correlation magnitudes for other delay values (a constant number of cross-correlation magnitudes following the cross-correlation magnitude for each delay value) to the cross-correlation for each delay value. Thereby, Q (K)'s of the n delay values are obtained. A maximum value selection circuit 8 finds a maximum value Q (Kmax) of the Q (K)'s corresponding to the n delay values and outputs a corresponding delay value K max as a true frame phase at a frame phase output terminal 30.

FIG. 7 is a block diagram of a frame phase estimation circuit according to still another embodiment of the invention in which the value l for oversampling is taken into consideration. In this diagram, similar elements as shown in FIG. 2A are denoted by similar reference numerals and their description is therefore omitted.

In this embodiment, the cross-correlation values obtained in the cross-correlation circuits 1 to M are held in a cross-correlation value holding circuit 72. A number M of selective adder circuits 1 to M are provided to selectively add the cross-correlation values for each lead phase, similar to the embodiment of FIG. 6, and maximum value selection circuit 80 outputs values $k_{max}$ and $l_{max}$ corresponding to the maximum sum of cross-correlation values from selective adder circuits 1 to M.

As mentioned in the above, according to the present invention, a cross-correlation magnitude corresponding to an initial phase is added to cross-correlation magnitudes corresponding to a predetermined number of initial phases following that initial phase, and the frame phase estimation is performed based upon resultant sums as the objects of comparison; thereby there is achieved the result that a frame phase estimation method and a frame phase estimation circuit are realized in which a frame phase is estimated accurately without being influenced by interference between signals, multipath propagation delay, or noise.

What is claimed is:

1. A frame phase estimation method for estimating an optimum initial phase of a digital signal which is subject to distortion from multipath interference or noise, comprising the steps of:

changing an initial setting of an initial phase of a received signal by a plurality of successive delay values to obtain a plurality of delayed received signals having sequentially delayed initial phases;

calculating a cross-correlation value of each of said delayed received signals with a known signal pattern;

adding a predetermined number of cross-correlation values of subsequent delayed received signals to the cross-correlation value of each delayed received signal to obtain a sum of cross-correlation values for each of said plurality of delayed received signals; and estimating the optimum initial phase of said received signal as the initial phase of the delayed received signal having the maximum sum of cross-correlation values.

2. A frame phase estimation circuit for estimating an optimum initial phase of a digital signal which is subject to distortion from multipath interference or noise, comprising:

means for changing an initial setting of an initial phase of a received signal by a plurality of successive delay values to obtain a plurality of delayed received signals having sequentially delayed initial phases;

means for calculating a cross-correlation value of each of said delayed received signals with a known signal pattern;

means for adding a predetermined number of cross-correlation values of subsequent delayed received signals to the cross-correlation value of each delayed received signal to obtain a sum of cross-correlation values for each of said plurality of delayed received signals; and means for estimating the optimum initial phase of said received signal as the initial phase of the delayed received signal having the maximum sum of cross-correlation values.

3. A frame phase estimation circuit according to claim 2, wherein said means for changing comprises a plurality of successive delay circuits for applying different delay values to said received signal;

said means for calculating comprises a plurality of cross-correlation circuits each having inputs connected to a respective delay circuit output terminal and a transmitted signal pattern output terminal;

said means for adding comprises a selective adder circuit for selecting predetermined outputs of said cross-correlation circuits for adding to each cross-correlation value; and said means for estimating comprises a maximum value selection circuit for outputting an optimum initial phase corresponding to the initial phase of the delayed received signal having a maximum sum of cross-correlation values produced by said selective adder circuit.

4. A frame phase estimation circuit according to claim 3, wherein the delay values of each of said successive delay circuits differs by an amount equal to a period of one sample of said received signal from an adjacent delay circuit.

5. A frame phase estimation circuit according to claim 3, wherein said received signal is oversampled by a selected multiple of a period of one sample of said received signal, and the delay values of each of said successive delay circuits differs by an amount equal to a predetermined combination of said sample period of said received signal and a period of said oversampling multiple from an adjacent delay circuit.

6. A frame phase estimation method for estimating an optimum initial phase of a digital signal which is subject to distortion from multipath interference or noise, comprising the steps of:

changing an initial setting of an initial phase of a received signal by a plurality of successive delay values to obtain a plurality of delayed received signals having sequentially delayed initial phases;

calculating a cross-correlation value of each of said delayed received signals with a known signal pattern;

calculating based on a predetermined number of cross-correlation values of subsequent delayed received signals and each delayed received signal a value for each of said plurality of delayed received signals; and estimating the optimum initial phase of said received signal as the initial phase of the delayed received signal having an optimum value based on said cross-correlation values.

* * * * *